United States Patent
Gao et al.

(10) Patent No.: US 12,281,994 B2
(45) Date of Patent: Apr. 22, 2025

(54) MOVABLE DETECTION DEVICE AND DETECTION METHOD

(71) Applicant: NUCTECH COMPANY LIMITED, Beijing (CN)

(72) Inventors: Kejin Gao, Beijing (CN); Chunguang Zong, Beijing (CN); Yu Hu, Beijing (CN); Shangmin Sun, Beijing (CN); Quanwei Song, Beijing (CN); Junping Shi, Beijing (CN)

(73) Assignee: NUTECH COMPANY LIMITED, Beijing (CN)

( * ) Notice: Subject to any disclaimer, the term of this patent is extended or adjusted under 35 U.S.C. 154(b) by 196 days.

(21) Appl. No.: 18/012,866

(22) PCT Filed: Jun. 23, 2021

(86) PCT No.: PCT/CN2021/101833
§ 371 (c)(1),
(2) Date: Dec. 23, 2022

(87) PCT Pub. No.: WO2021/259327
PCT Pub. Date: Dec. 30, 2021

(65) Prior Publication Data
US 2023/0243763 A1    Aug. 3, 2023

(30) Foreign Application Priority Data
Jun. 23, 2020   (CN) .......................... 202010583789.3

(51) Int. Cl.
*G01N 23/04*    (2018.01)
*G01N 23/083*   (2018.01)
*G01N 23/10*    (2018.01)

(52) U.S. Cl.
CPC ............. *G01N 23/10* (2013.01); *G01N 23/04* (2013.01); *G01N 23/083* (2013.01); *G01N 2223/3303* (2013.01)

(58) Field of Classification Search
None
See application file for complete search history.

(56) References Cited

U.S. PATENT DOCUMENTS

| 7,388,205 B1 * | 6/2008 | Verbinski ................. G01V 5/26 |
| | | 250/358.1 |
| 7,483,511 B2 | 1/2009 | Bendahan et al. |

(Continued)

FOREIGN PATENT DOCUMENTS

| CN | 101382508 A | 3/2009 |
| CN | 103529480 A | 1/2014 |

(Continued)

OTHER PUBLICATIONS

English Translation of International Search Report with Written Opinion for PCT application No. PCT/CN2021/101833 (9 pages).

(Continued)

*Primary Examiner* — Hoon K Song
(74) *Attorney, Agent, or Firm* — Merchant & Gould P.C.

(57) ABSTRACT

A mobile detection device and a detection method are provided. The mobile detection device includes: a bearing platform, being arranged fixedly, and including a bearing surface bearing an object to be detected; a movable gantry, located on a side of the bearing surface bearing the object to be detected and configured to be movable relative to the bearing platform; a movable bearing device, located on a side of the bearing surface away from the movable gantry and configured to be movable relative to the bearing platform; a first radiation source, arranged on one of the movable gantry and the movable bearing device, and a first detector array, arranged opposite to the radiation source and (Continued)

arranged on the other of the movable gantry and the movable bearing device, wherein the movable gantry and the movable bearing device are configured to be moved synchronously relative to the bearing platform.

11 Claims, 7 Drawing Sheets

(56) References Cited

U.S. PATENT DOCUMENTS

| | | | |
|---|---|---|---|
| 2007/0040911 | A1 | 2/2007 | Riley |
| 2008/0123809 | A1 | 5/2008 | Tudor et al. |
| 2015/0219786 | A1* | 8/2015 | Wieschemann ......... B66F 9/063 378/57 |

FOREIGN PATENT DOCUMENTS

| | | |
|---|---|---|
| CN | 106053497 A | 10/2016 |
| CN | 205808968 A | 12/2016 |
| CN | 106645225 A | 5/2017 |
| CN | 106680301 A | 5/2017 |
| CN | 206427954 U | 8/2017 |
| CN | 107479103 A | 12/2017 |
| CN | 108614301 A | 10/2018 |
| CN | 108614302 A | 10/2018 |
| CN | 208547727 U | 2/2019 |
| CN | 109541707 A | 3/2019 |
| CN | 112433258 A | 3/2021 |

OTHER PUBLICATIONS

First Office Action issued on May 19, 2022 from CNIPA for Chinese Patent Application No. 202010583789.3 (8 pages).
Second Office Action issued on Jun. 24, 2022 from CNIPA for Chinese Patent Application No. 202010583789.3 (7 pages).
"Introduction to Nuclear Energy and Nuclear Technology", Harbin Engineering University Press, Edited by Wei Yixiang and Jia Baoshan (3 pgs).
Extended European Search Report dated Jun. 24, 2024 for corresponding EP Application No. 21829645.7 (21 pages).

* cited by examiner

MOVABLE DETECTION DEVICE AND DETECTION METHOD

CROSS REFERENCE TO RELATED APPLICATION(S)

This application is a Section 371 National Stage Application of International Application No. PCT/CN2021/101833, filed on Jun. 23, 2021, entitled "MOVABLE DETECTION DEVICE AND DETECTION METHOD", which is incorporated herein by reference in its entirety which claims priority to Chinese patent Application No. 202010583789.3, filed on Jun. 23, 2020 to the China National Intellectual Property Administration, the content of which are incorporated herein by reference in their entirety.

TECHNICAL FIELD

The present disclosure relates to a field of detection technology, and in particular, to a mobile detection device and a detection method.

BACKGROUND

The imaging manner of the current movable cargo/vehicle inspection system is usually that a radiation source is located on one side of a horizontal direction of an object to be detected, and a detector is located on the other side of the horizontal direction of the object to be detected, thereby forming a horizontal detection device. The object to be detected is scanned through a movement of the object to be detected relative to the detection device, thereby forming a detection image of a horizontal viewing angle.

SUMMARY

According to some embodiments of the present disclosure, there is provided a mobile detection device, including: a bearing platform, being arranged fixedly and including a bearing surface bearing an object to be detected; a movable gantry, located on a side of the bearing surface bearing the object to be detected and configured to be movable relative to the bearing platform; a movable bearing device, located on a side of the bearing surface away from the movable gantry and configured to be movable relative to the bearing platform; a first radiation source, arranged on one of the movable gantry and the movable bearing device, and a first detector array, arranged opposite to the radiation source and arranged on the other one of the movable gantry and the movable bearing device, wherein the movable gantry and the movable bearing device are configured to be moved synchronously relative to the bearing platform.

In some embodiments, the movable gantry includes: a crossbeam, arranged substantially parallel to the bearing surface, and an upright column, configured to support the crossbeam, wherein one of the first radiation source and the first detector array is arranged on the crossbeam and arranged toward the bearing platform.

In some embodiment, the mobile detection device further includes: a first moving assembly, mounted between an end portion of the upright column facing the bearing platform and the bearing platform and configured to allow the movable gantry to move relative to the bearing platform through the first moving assembly.

In some embodiments, the first mobile assembly includes: a first guide rail, arranged on a surface of the bearing platform facing the movable gantry; and a first moving component, arranged at the end portion of the upright column facing the bearing platform and cooperating with the first guide rail.

In some embodiments, the bearing structure includes an accommodation space located on a side of the bearing surface away from the movable gantry, and the movable bearing device is arranged within the accommodation space.

In some embodiments, the mobile detection device further includes: a second moving assembly, arranged between a surface of a side of the movable bearing device away from the movable gantry and the bearing platform and configured to allow the movable bearing device to move relative to the bearing platform through the second moving assembly.

In some embodiments, the second mobile assembly includes: a second guide rail, arranged on a surface of the bearing platform bearing the movable bearing device; and a second moving component, arranged on the surface of the side of the movable bearing device away from the movable gantry and cooperating with the second guide rail.

In some embodiments, the upright column includes: a first upright column and a second upright column, respectively connected with both end portions of the crossbeam, and the mobile detection device further includes: a second radiation source, arranged on one of the first upright column and the second upright column, and a second detector array, arranged opposite to the radiation source, and arranged on the other one of the first upright column and the second upright column.

In some embodiments, the mobile detection device further includes: a control device, configured to control the movable gantry and the movable bearing device to be moved synchronously relative to the bearing platform along a first direction.

In some embodiments, the control device includes: a first control device, configured to control a moving speed of the movable gantry relative to the bearing platform along the first direction in real time; and a second control device, configured to control a moving speed of the movable bearing device relative to the bearing platform along the first direction in real time.

In some embodiments, he mobile detection device further includes: a first distance measuring device, configured to measure a first real-time distance between a fixed reference point on the bearing platform and the movable gantry along the first direction in real time; and a second distance measuring device, configured to measure a second real-time distance between the fixed reference point on the bearing platform and the movable bearing device along the first direction in real time.

In some embodiments, with the first real-time distance being taken as a benchmark, the second control device is configured to control the moving speed of the movable bearing device relative to the bearing platform along the first direction in real time, so that the movable gantry and the movable bearing device are moved synchronously relative to the bearing platform along the first direction, or with the second real-time distance being taken as a benchmark, the first control device is configured to control the moving speed of the movable gantry relative to the bearing platform along the first direction in real time, so that the movable gantry and the movable bearing device are moved synchronously relative to the bearing platform along the first direction.

According to some embodiments of the present disclosure, there is provided a detection method, using a mobile detection device according to a preceding embodiment. The method includes: arranging the object to be detected on the bearing surface of the bearing platform; activating the first radiation source; and moving the movable gantry and the movable bearing device synchronously.

BRIEF DESCRIPTION OF THE DRAWINGS

In order to illustrate the technical solutions of the embodiments of the present disclosure more clearly, the accompanying drawings of the embodiments will be briefly described below. It should be understood that the drawings described below only relate to some embodiments of the present disclosure, but do not intend to limit the present disclosure, in which.

DETAILED DESCRIPTION OF EMBODIMENTS

Figure 1:
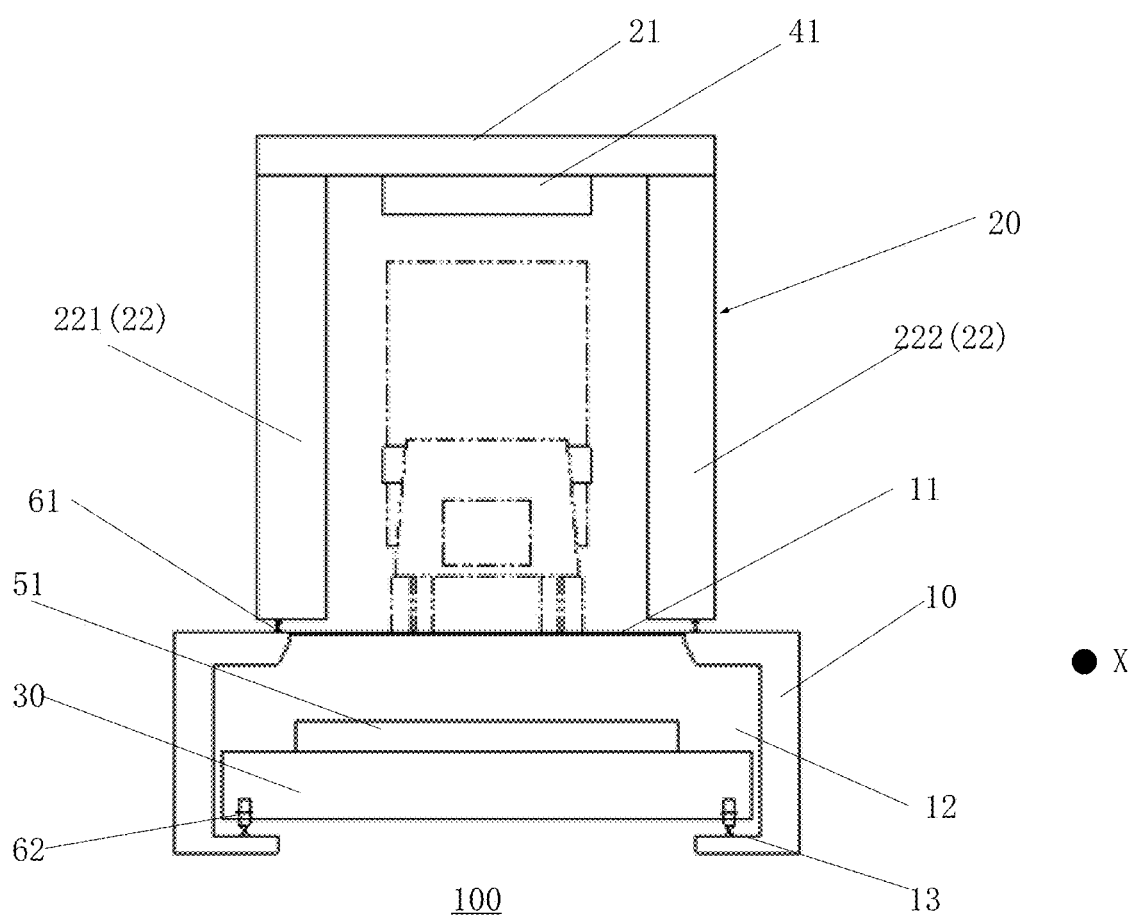
FIG. 1 is a schematic structural diagram of a mobile detection device according to some embodiments of the present disclosure.

In order to more clearly illustrate the objectives, technical solutions and advantages of the present disclosure, the embodiments of the present disclosure will be described in detail below with reference to the accompanying drawings. It should be understood that the following description of the embodiments is intended to explain and illustrate the general concept of the present disclosure, and should not be construed as limiting the present disclosure. In the specification and drawings, a same or similar reference sign refers to a same or similar member or component. For the purpose of clarity, the drawings are not necessarily drawn to scale and some well-known components and structures may be omitted in the drawings.

Unless otherwise defined, technical terms or scientific terms used in the present disclosure shall have the ordinary meanings as understood by those of ordinary skill in the art to which the present disclosure pertains. "First", "second" and a similar word used in the present disclosure do not indicate any order, quantity, or importance, but are merely used to distinguish various constituent parts. The expression "a"/"an" or "one" does not exclude a plurality. "Include" or "contain" and a similar word means that an element or object appearing before such word encompass an element or object and an equivalent thereof listed after such word, but does not exclude another element or object. A word like "connect" or "couple" is not limited to a physical or mechanical connection, but may include an electrical connection, no matter it is a direct or an indirect electrical connection. "Upper", "lower", "left", "right", "top" or "bottom" is only used to indicate a relative positional relationship. When an absolute position of a described object is changed, the relative positional relationship may also be changed correspondingly. When an element is referred to as being "above" or "below" another element, the element may be "directly above" or "below" the another element, or there may exist an intermediate element.

According to some embodiments of the present disclosure, there is provided a mobile detection device, including: a bearing platform being arranged fixedly, a movable gantry, a movable bearing device, a first radiation source and a first detector array. The bearing platform includes a bearing surface bearing an object to be detected; the movable gantry is located on a side of the bearing surface bearing the object to be detected and configured to be movable relative to the bearing platform; the movable bearing device is located on a side of the bearing surface away from the movable gantry and configured to be movable relative to the bearing platform; the first radiation source is arranged on one of the movable gantry and the movable bearing device, and the first detector array is arranged opposite to the radiation source and arranged on the other one of the movable gantry and the movable bearing device. The movable gantry and the movable bearing device are configured to be moved synchronously relative to the bearing platform.

In the mobile detection device provided according to the present disclosure, the first radiation source and the first detector array are respectively arranged above and below the object to be detected, or the first radiation source and the first detector array are respectively arranged below and above the object to be detected, and through a movement of the first radiation source and the first detector array relative to the object to be detected, the object to be detected may be scanned to form a detection image of a vertical viewing angle. When the object to be detected is a large cargo or a vehicle, a better detection effect may be provided by using the detection image of the vertical viewing angle than using the detection image of a horizontal viewing angle.

FIG. 1 is a schematic structural diagram of a mobile detection device according to some embodiments of the present disclosure. As shown in FIG. 1, the mobile detection device 100 includes: a bearing platform 10 being arranged fixedly, a movable gantry 20, a movable bearing device 30, a first radiation source 41 and a first detector array 51. The bearing platform 10 includes a bearing surface 11 bearing an object to be detected, the object to be detect being for example a vehicle. The movable gantry 20 is located on a side of the bearing surface 11 bearing the object to be detected and configured to be movable relative to the bearing platform 10; the movable bearing device 30 is located on a side of the bearing surface 11 away from the movable gantry 20 and configured to be movable relative to the bearing platform 10; and the movable gantry 20 and the movable bearing device 30 are configured to be moved synchronously relative to the bearing platform 10.

In some embodiments, the bearing surface 11 may be substantially located on a ground position to facilitate a movement of the object to be detected to the bearing surface 11. For example, when the object to be detected is a vehicle, the vehicle to be detected may be driven by a driver directly to the bearing surface 11. The bearing platform 10 and the movable bearing device 30 may be arranged in a groove formed on the ground, and a main body portion of the bearing platform 10 and the movable bearing device 30 are located on a lower side of the ground.

As shown in FIG. 1, the movable gantry 20 includes a crossbeam 21 and an upright column 22 supporting the crossbeam 21. The crossbeam 21 is substantially parallel to the bearing surface 11 of the bearing platform 10, for example, arranged horizontally. The upright column 22 includes a first upright column 221 and a second upright column 222 respectively connected with both ends of the crossbeam 21. The first radiation source 41, such as an X-ray emitting device, is arranged on the crossbeam 21, arranged toward the bearing platform 10, and used to emit a ray for detection, such as an X-ray, toward the bearing surface 11. The ray for detection may penetrate the object to be detected arranged on the bearing surface 11. Specifically, as shown in FIG. 1, the first radiation source 41 is arranged on a surface of the crossbeam 21 facing the bearing surface 11. However, the embodiments of the present disclosure are not limited thereto. In some embodiments, the first radiation source 41 may also be arranged at another position of the crossbeam 21. For example, the first radiation source 41 may also be arranged within the crossbeam 21. In some embodiments, the first radiation source 41 may also be arranged on a side of the crossbeam 21 away from the bearing surface 11, for example, arranged in a radiation source accommodation cabin fixed on an upper side of the crossbeam 21, and it is sufficient as long as the first radiation source 41 may emit a ray for detection toward the bearing surface 11 in a vertical direction.

In some embodiments, the radiation source accommodation cabin may be made of a metal material, and is configured to accommodate a component such as a radiation source. In some embodiments, the radiation source accommodation cabin may be omitted.

As shown in FIG. 1, the bearing platform 10 includes an accommodation space 12 located on a side of the bearing surface 11 away from the movable gantry 20, and the movable bearing device 30 is arranged within the accommodation space 12. The bearing structure 10 further includes a surface 13 bearing the movable bearing device 30, and the surface 13 is arranged parallel to the bearing surface 11. The first detector array 51 is arranged on the movable bearing device 30, arranged opposite to the radiation source 41, and used to receive the ray for detection emitted by the first radiation source 41 and generate an output signal. The output signal is used to generate a visible image. Specifically, as shown in FIG. 1, the first detector array 51 is arranged on a surface of the movable bearing device 30 facing the bearing surface 11. However, the embodiments of the present disclosure are not limited thereto. In some embodiments, the first detector array 51 may also be arranged at another position of the movable bearing device 30. For example, the first detector array 51 may also be arranged within the movable bearing device 30, and it is sufficient as long as the first detector array 51 may receive a ray for detection emitted by the first radiation source 41 in the vertical direction.

The ray for detection emitted by the first radiation source 41 is a surface-shaped ray beam perpendicular to the bearing surface 11 and parallel to the crossbeam 21. The surface-shaped ray beam is transmitted from top to bottom, and is referred to as a first surface-shaped ray beam. It may be understood that the first surface-shaped ray beam is located in a section shown in FIG. 1, and the first surface-shaped ray beam may cover the entire object to be detected in this section. In order to detect the entire object to be detected, the first surface-shaped ray beam needs to be moved relative to the object to be detected along a first direction X perpendicular to the above section to complete a scanning detection of the object to be detected, and then generate a detection image.

In this embodiment, the object to be detected is fixed on the bearing surface 11 of the bearing structure 10, and the movable gantry 20 provided with the first radiation source 41 and the movable bearing device 30 provided with the first detector array 51 may be moved synchronously along the first direction X perpendicular to the above section relative to the bearing structure 10, so as to scan the object to be detected by the surface-shaped ray beam. Taking the object to be detected as a vehicle as an example, compared with the solution that a driver drives the vehicle to achieve a vehicle scanning through the surface-shaped ray beam, in the solution of the present disclosure, the driver does not need to be exposed to the ray of detection during the detection process, thereby avoiding an injury to a person caused by the ray of detection.

As shown in FIG. 1, the mobile detection device 100 includes a first moving assembly 61. The first moving assembly 61 is arranged between an end portion of the upright column 22 of the movable gantry 20 facing the bearing platform 10 and the bearing platform 10. The movable gantry 20 may be moved relative to the bearing platform 10 in the first direction X perpendicular to the section through the first moving assembly 61.

Figure 2:
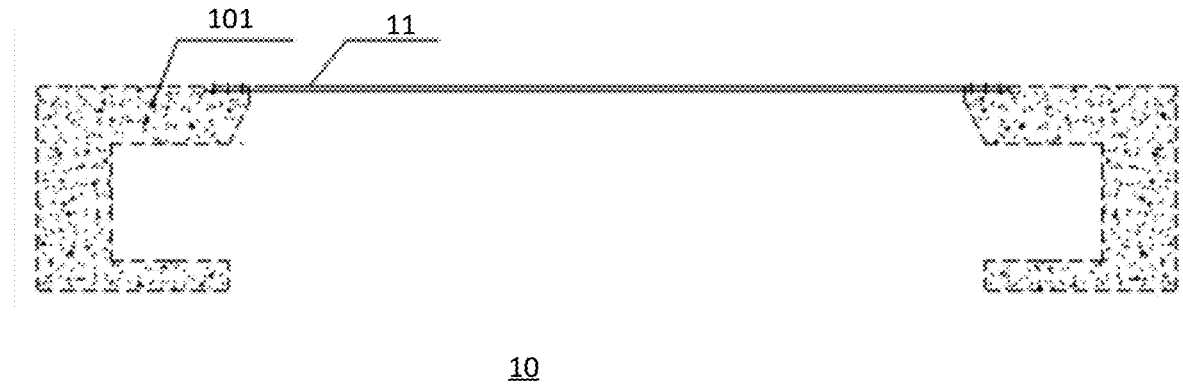
FIG. 2 is a schematic structural diagram of a bearing platform according to some embodiments of the present disclosure.

FIG. 2 is a schematic structural diagram of a bearing platform according to some embodiments of the present disclosure. In some embodiments, the bearing surface 11 should have a uniform density and a relatively small mass. As shown in FIG. 2, the bearing platform 10 includes a main body portion 101 and a bearing surface 11, and the main body portion 101 may be of a concrete structure. In some embodiments, the bearing surface 11 may be of a solid plate structure, for example, it may be made of a high carbon steel or an aluminum alloy, a titanium alloy, etc., which has the characteristics of a high bearing strength and a uniform density. In some embodiments, the bearing surface 11 may also be of a profile structure or be formed by welding a plurality of profile structures. For example, the bearing surface 11 is a high-strength aluminum alloy profile, which may meet the bearing strength. The bearing surface 11 may be connected with the main body portion 101 made of concrete by using high-strength bolts, and at the same time, it may also be welded with steel parts embedded in the concrete to enhance the tensile strength.

Figure 3:
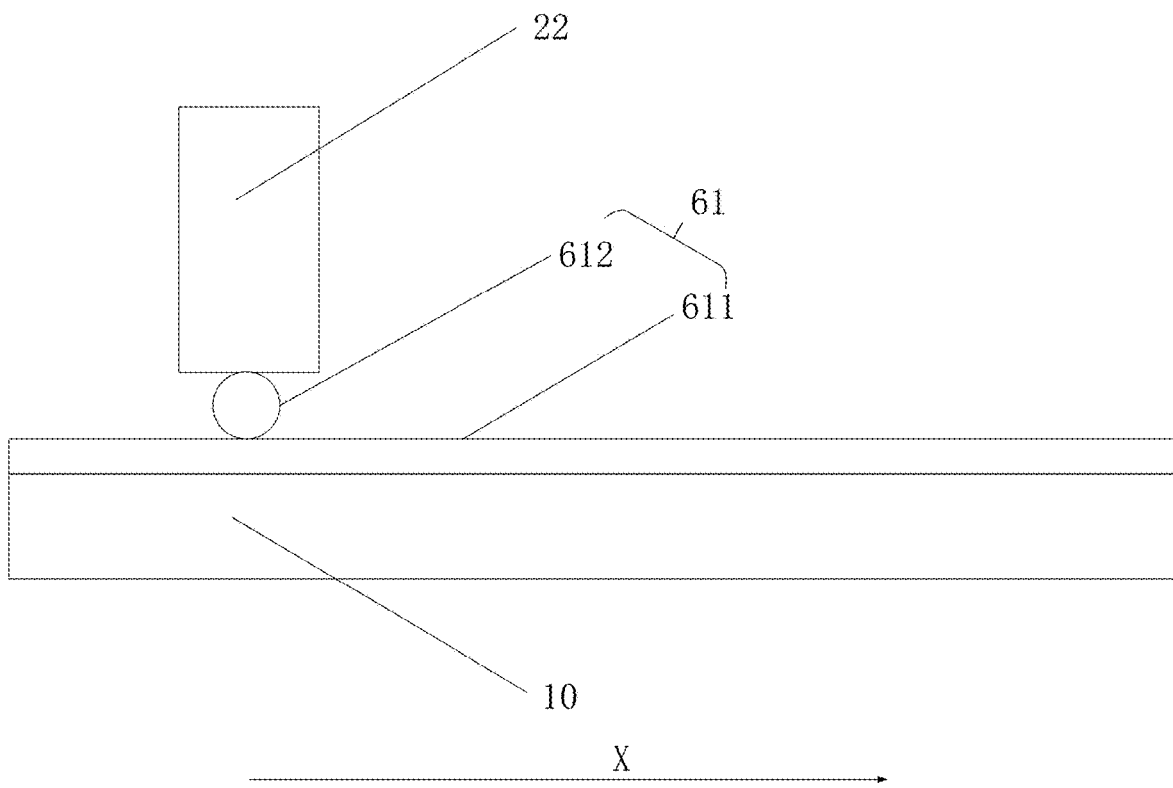
FIG. 3 is a schematic partial side view of a mobile detection device according to some embodiments of the present disclosure.

FIG. 3 is a schematic partial side view of a mobile detection device according to some embodiments of the present disclosure. As shown in FIG. 3, the first moving assembly 61 may include a first guide rail 611 and a first moving component 612. The first guide rail 611 is arranged on a surface of the bearing platform 10 facing the movable gantry 20 and extends along the first direction X. The first moving component 612 is arranged at the end portion of the upright column 22 of the movable gantry 20 facing the bearing platform 10 and cooperates with the first guide rail 611, thereby achieving a relative movement of the movable gantry 20 and the bearing platform 10 along the first direction X. The first moving component 612 may be a roller in a rolling cooperation with the first guide rail 611. At this time, the relative movement of the movable gantry 20 and the bearing platform 10 along the first direction X may be achieved by driving the roller to rotate through a roller driving device, such as a motor, and the roller is moved along an extending direction of the first guide rail 611 under a driving of the roller driving device. With this manner, the mounting space is small, the universality is strong, and the adjustment adaptability for a straight walking may be ensured. That is, the relative movement of the movable gantry 20 and the bearing platform 10 in the first direction X may be ensured to be a linear movement.

In some embodiments, the first moving component 612 may also be a sliding block in a sliding cooperation with the first guide rail 611.

In some embodiments, the first moving component 612 may drive the movable gantry 20 to be moved in the first direction X along a predetermined track, and the first guide rail 611 may be omitted in the first moving assembly 61. At this time, the first moving component 612 may be a roller, such as a roller including a tyre. The relative movement of the movable gantry 20 and the bearing platform 10 along the first direction X may be achieved by driving the roller to rotate through a roller driving device, such as a motor, and the roller is moved along the first direction X under a driving of the roller driving device. With this manner, no guide rail may be arranged, the quantity of civil construction is small, and a better shock absorption function is provided.

In some embodiments, the quantity of the first moving component 612 arranged at the end portion of the upright column 22 (the first upright column 221 or the second upright column 222) facing the bearing platform 10 may be one or more, which is not specifically defined herein.

As shown in FIG. 1, the mobile detection device 100 further includes a second mobile assembly 62. The second mobile assembly 62 is arranged between a surface of a side of the movable bearing device 30 away from the movable gantry 20 and a surface of the bearing platform 10 bearing the movable bearing device 30. The movable bearing device 30 may be moved relative to the bearing platform 10 along the first direction X perpendicular to the section through the second moving assembly 62.

Figure 4:
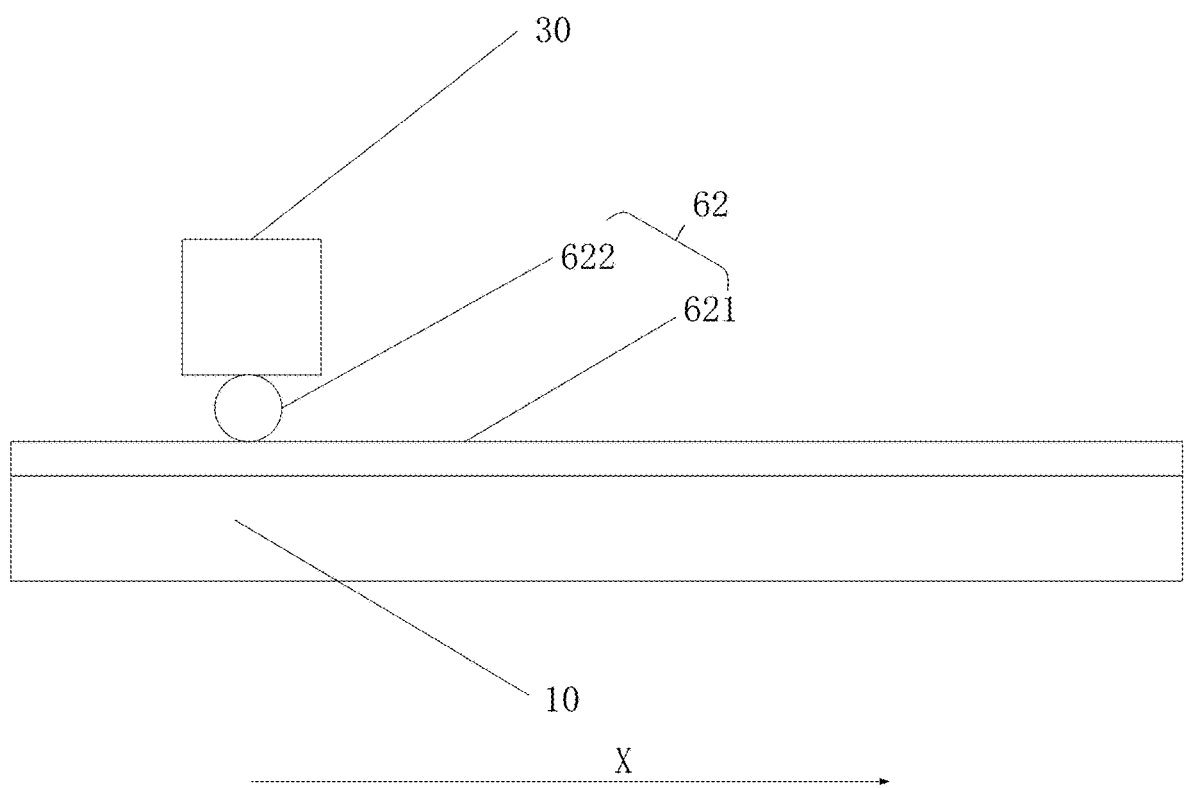
FIG. 4 is a schematic partial side view of a mobile detection device according to some embodiments of the present disclosure.

FIG. 4 is a schematic partial side view of a mobile detection device according to some embodiments of the present disclosure. As shown in FIG. 4, the second mobile assembly 62 may include a second guide rail 621 and a second moving component 622. The second guide rail 621 is arranged on a surface of the bearing platform 10 bearing the movable bearing device 30, and extends along the first direction X. The second moving component 622 is arranged on the surface of the side of the movable bearing device 30 away from the movable gantry 20 and cooperates with the second guide rail 621, thereby achieving a relative movement of the movable bearing device 30 and the bearing platform 10 along the first direction X. The second moving component 622 may be a roller in a rolling cooperation with the second guide rail 621. At this time, the relative movement of the movable bearing device 30 and the bearing platform 10 along the first direction X may be achieved by driving the roller to rotate through a roller driving device, such as a motor, and the roller is moved along an extending direction of the second guide rail 621 under a driving of the roller driving device. With this manner, the mounting space is small, the universality is strong, and the adjustment adaptability for a straight walking may be ensured. That is, the relative movement of the movable bearing device 30 and the bearing platform 10 in the first direction X may be ensured to be a linear movement.

In some embodiments, the second moving component 622 may also be a sliding block in a sliding cooperation with the second guide rail 621.

In some embodiments, the second moving component 622 may drive the movable bearing device 30 to be moved in the first direction X along a predetermined track, and the second guide rail 621 may be omitted in the second moving assembly 62. At this time, the second moving component 612 may be a roller, such as a roller including a tyre. The relative movement of the movable bearing device 30 and the bearing platform 10 along the first direction X may be achieved by driving the roller to rotate through a roller driving device, such as a motor, and the roller is moved along the first direction X under a driving of the roller driving device. With this manner, no guide rail may be arranged, the quantity of civil construction is small, and a better shock absorption function is provided.

In some embodiments, the quantity of the second moving component 622 arranged on the surface of the side of the movable bearing device 30 away from the movable gantry 20 may be one or more, which is not specifically defined herein.

The mobile detection device 100 may further include a control device configured to control the movable gantry 20 and the movable bearing device 30 to be moved synchronously relative to the bearing platform 10 in the first direction X. In this way, the first radiation source 41 and the first detector array 51 may be moved synchronously relative to the bearing structure 10 along the first direction X perpendicular to the above section, and the relative position between the first radiation source 41 and the first detector array 51 remains unchanged, thereby achieving a scanning detection of the object to be detected.

Figure 5:
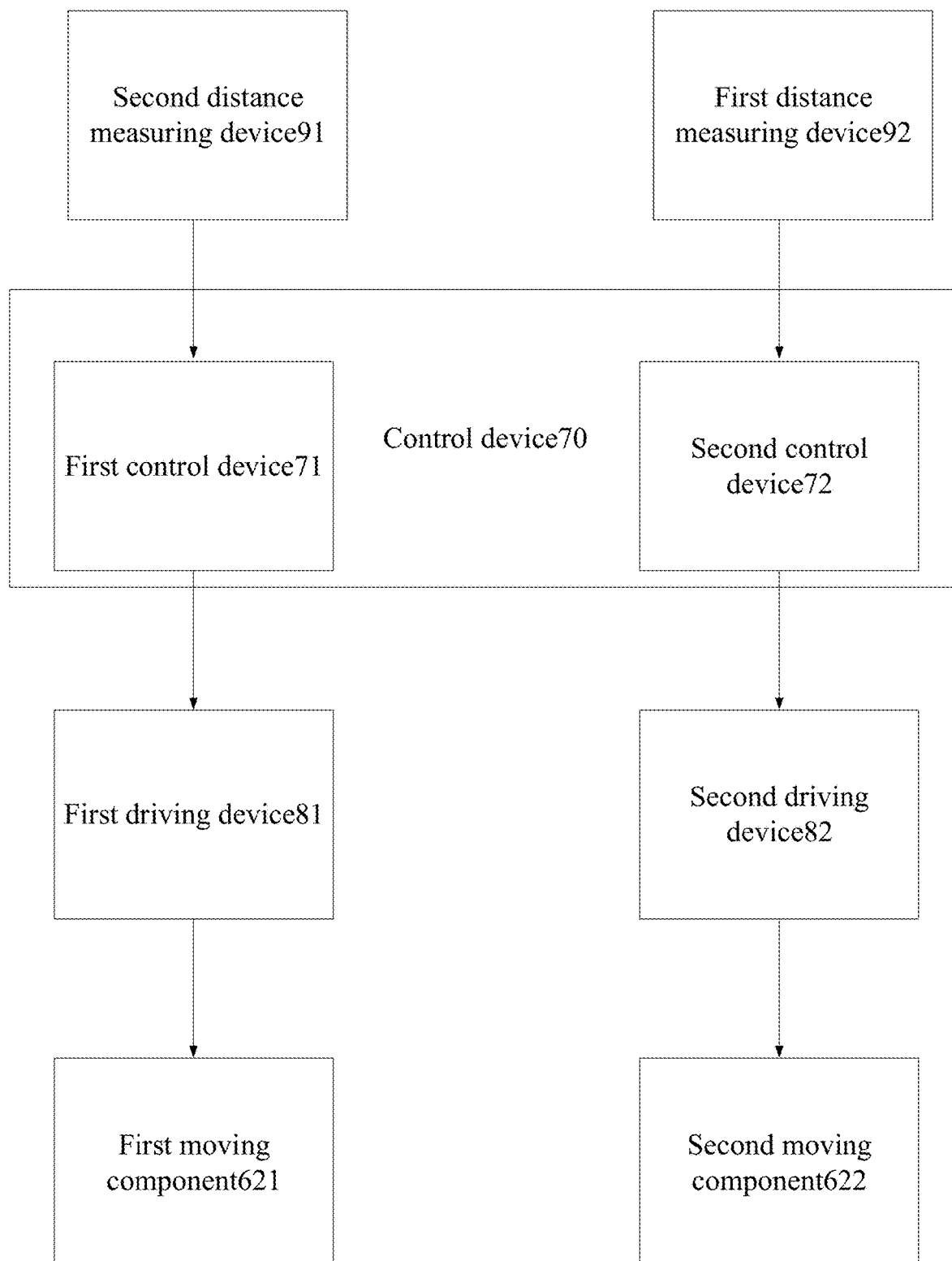
FIG. 5 is a schematic structural diagram of a control system of a mobile detection device according to some embodiments of the present disclosure.

FIG. 5 is a schematic structural diagram of a control system of a mobile detection device according to some embodiments of the present disclosure. Specifically, as shown in FIG. 5, the control device 70 includes a first control device 71 and a second control device 72. The first control device 71 controls a first driving device 81, such as a motor, to drive the first moving component 612, such as a roller to move, so as to allow a relative movement of the movable gantry 20 and the bearing platform 10 along the first direction X. The first driving device 81 may be a roller driving device. The first control device 71 may control a moving speed of the movable gantry 20 relative to the bearing platform 10 along the first direction X in real time. The second control device 72 controls a second driving device 82, such as a motor, to drive the second moving component 612, such as a roller to move, so as to allow a relative movement of the movable bearing device 30 and the bearing platform 10 along the first direction X. The second driving device 82 may be a roller driving device. The second control device 72 may control a moving speed of the movable bearing device 30 relative to the bearing platform 10 along the first direction X in real time.

The mobile detection device further includes a first distance measuring device 91 and a second distance measuring device 92. The first distance measuring device 91 is arranged on the movable gantry 20 and may measure a first real-time distance between a fixed reference point on the bearing platform 10 and the movable gantry 20 along the first direction in real time. The second distance measuring device 92 is arranged on the movable bearing device 30 and may measure a second real-time distance between the fixed reference point on the bearing platform 10 and the movable bearing device 30 along the first direction in real time.

In some embodiments, with the first real-time distance being taken as a benchmark, the second control device 72 controls the moving speed of the movable bearing device 20 relative to the bearing platform 10 along the first direction in real time, so that the movable gantry 20 and the movable bearing device 30 are moved synchronously relative to the bearing platform 10 along the first direction X.

In some embodiments, with the second real-time distance being taken as a benchmark, the first control device 71 controls the moving speed of the movable gantry 20 relative to the bearing platform 10 along the first direction X in real time, so that the movable gantry 20 and the movable bearing device 30 are moved synchronously relative to the bearing platform 10 along the first direction X.

Specifically, in some embodiments, in order to ensure that the movable gantry 20 and the movable bearing device 30 are moved synchronously relative to the bearing platform 10 along the first direction X, a wire distance measuring device may be provided on the movable gantry 20 and the movable bearing device 30, and the wire distance measuring device may measure a real-time distance between a fixed reference point on the bearing platform 10 and the movable gantry 20 or the movable bearing device 30 where the wire distance measuring device is located in real time. With a real-time distance between a fixed reference point on the bearing platform 10 and one of the movable gantry 20 and the movable bearing device 30 being taken as a benchmark, a control device corresponding to the other one of the movable gantry 20 and the movable bearing device 30 adjusts a corresponding driving device thereof, such as a rotation speed of the motor, based on this benchmark in real time, so that the movable gantry 20 and the movable bearing device 30 are moved synchronously relative to the bearing platform 10 in the first direction X. Specifically, for example, with a real-time distance between a fixed reference point on the bearing platform 10 and the movable gantry 20 being taken as a benchmark, when a difference value between the real-time distance between the fixed reference point on the bearing platform 10 and the movable bearing device 30 and the above benchmark is greater than a predetermined threshold, the control device corresponding to the movable bearing device 30 adjusts a rotation speed of the second driving device 82, such as acceleration or deceleration, so that the movable gantry 20 and the movable bearing device 30 are moved synchronously relative to the bearing platform 10 along the first direction X.

In some embodiments, the wire distance measuring device may be replaced with other distance measuring devices such as a distance measuring wheel and a distance measuring guide rail. All of these distance measuring devices may measure a real-time distance between a fixed reference point on the bearing platform 10 and the movable gantry 20 or the movable bearing device 30 where the distance measuring device is located in real time. With a real-time distance between a fixed reference point on the bearing platform 10 and one of the movable gantry 20 and the movable bearing device 30 being taken as a benchmark, a control device corresponding to the other one of the movable gantry 20 and the movable bearing device 30 adjusts a rotation speed of a corresponding driving device thereof based on this benchmark in real time, so that the movable gantry 20 and the movable bearing device 30 are moved synchronously relative to the bearing platform 10 in the first direction X.

In some embodiments, the distance measuring device is, for example, a grating distance measuring device. The grating distance measuring device includes a grating ruler fixedly arranged on the ground or on the bearing platform 10. The grating ruler extends along the first direction X. An infrared light source and a receiver are provided on each of the movable gantry 20 and the movable bearing device 30. The infrared light emitted by the infrared light source may be received by the receiver through the grating ruler. When the movable gantry 20 or the movable bearing device 30 is moved relative to the bearing platform 10 along the first direction X, the grating distance measuring device may measure a real-time relative displacement between the movable gantry 20 or the movable bearing device 30 and the bearing platform 10. That is, the grating distance measuring device may measure a real-time distance between the fixed reference point on the bearing platform 10 and the movable gantry 20 or the movable bearing device 30 in real time. In this embodiment, the principle that the control device 70 controls the movable gantry 20 and the movable bearing device 30 to be moved synchronously relative to the bearing platform 10 in the first direction X is the same as that in the preceding embodiment, and will not be repeated here.

In some embodiments, in order to ensure that the movable gantry 20 and the movable bearing device 30 are moved synchronously relative to the bearing platform 10 in the first direction X, an encoder may be provided on each of the first driving device 81 and the second driving device 82. The encoder may measure the corresponding driving device, such as the rotation speed of the motor in real time. The rotation speed of the motor is in positive correlation with the rotation speed of the roller. In this way, a real-time distance between the fixed reference point on the bearing platform 10 and the movable gantry 20 or movable bearing device 30 may be measured. With a real-time rotation speed measured by an encoder provided in one of the first driving device 81 and the second driving device 82 being taken as a benchmark, the other one of the first driving device 81 and the second driving device 82 adjusts a rotation speed thereof in real time according to the above measured benchmark under a control of a corresponding control device thereof, so that a rotation speed of the roller driven thereby matches a rotation speed of the roller driven by one of the first driving device 81 and the second driving device 82, and therefore, the movable gantry 20 and the movable bearing device 30 may be moved synchronously relative to the bearing platform 10 in the first direction X.

In the preceding embodiments, the first radiation source 41 and the first detector array 51 of the mobile detection device 100 are respectively arranged above and below the object to be detected, through a movement of the first radiation source 41 and the first detector array 51 relative to the object to be detected in the first direction X, the object to be detected may be scanned to form a detection image of a vertical viewing angle, such as a top view detection image, and a better detection effect may be provided.

Figure 6:
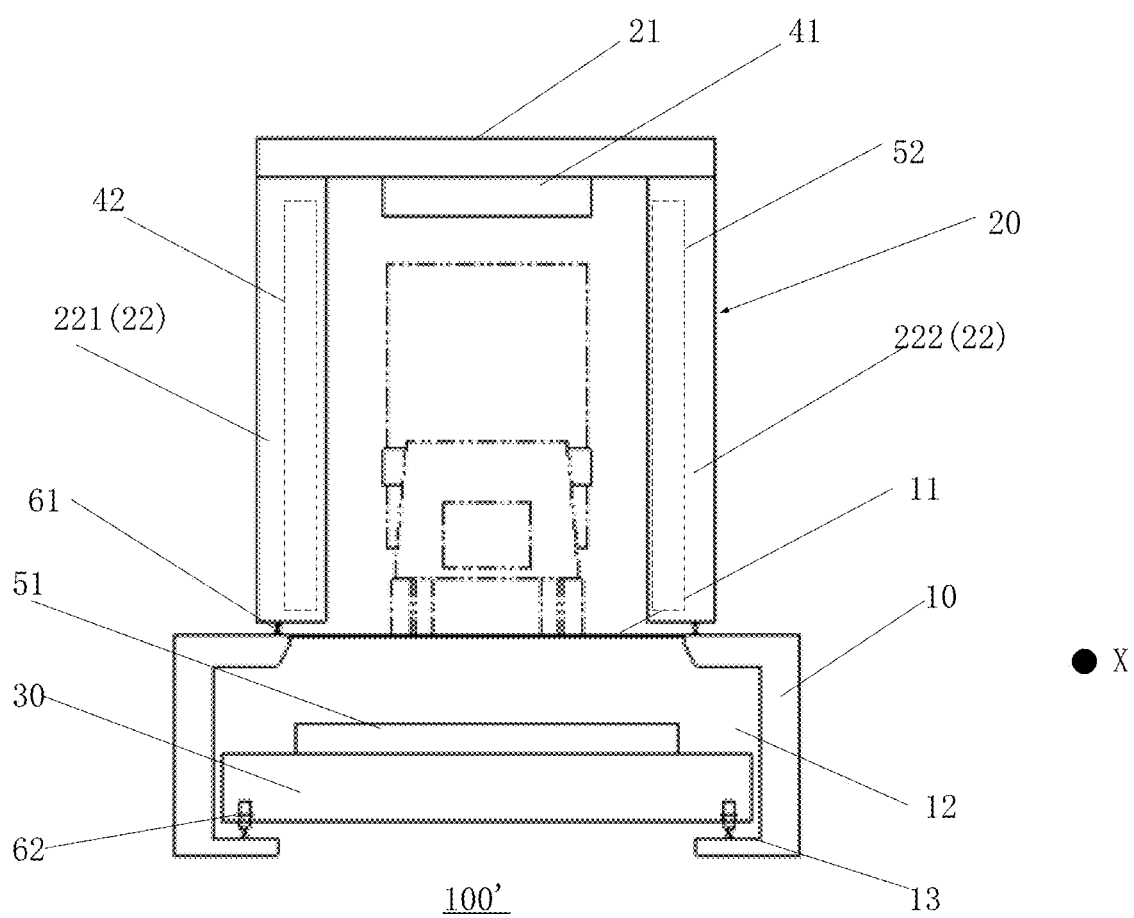
FIG. 6 is a schematic structural diagram of a mobile detection device according to some embodiments of the present disclosure.

FIG. 6 is a schematic structural diagram of a mobile detection device according to some embodiments of the present disclosure. The structure of the mobile detection device 100' shown in FIG. 6 is substantially the same as that of the mobile detection device 100 in the preceding embodiments. In the following, the differences between the mobile detection device 100' and the mobile detection device 100 in the preceding embodiments are mainly described in detail, and the similarities will not be repeated in detail.

As shown in FIG. 6, in addition to the first radiation source 41 arranged on the crossbeam 21 of the movable gantry 20 and the first detector array 51 arranged on the movable bearing device 30, the mobile detection device 100' further includes a second radiation source 42 arranged on the first upright column 221 and a second detector array 52 arranged on the second upright column 222.

Specifically, as shown in FIG. 6, the second radiation source 42 is arranged in the first crossbeam 221 and used to emit a ray for detection, such as an X-ray, toward the second upright column 222. The ray for detection may penetrate the object to be detected arranged on the bearing surface 11. In some embodiments, the second radiation source 42 may also be arranged at another position of the first crossbeam 221. For example, the second radiation source 42 may also be arranged on a surface of a side of the first upright column 221 facing the second upright column 222. For example, the second radiation source 42 may also be arranged on a side of the first upright column 221 away from the second upright column 222, for example, arranged in a radiation source accommodation cabin fixed on a left side of the first upright column 221, and it is sufficient as long as the second radiation source 42 may emit a ray for detection toward the second upright column 222 in a horizontal direction.

As shown in FIG. 6, the second detector array 52 is arranged in the second upright column 222, arranged opposite to the second radiation source 42, and used to receive a ray for detection emitted by the second radiation source 42. The relative position between the second radiation source 42 and the second detector array 52 remains unchanged. In some embodiments, the second detector array 52 may also be arranged at another position of the second upright column 222. For example, the second detector array 52 may also be arranged on a surface of a side of the second upright column 222 facing the first upright column 221, and it is sufficient as long as the second detector array 52 may receive a ray for detection emitted by the second radiation source 42 in the horizontal direction.

The ray for detection emitted by the second radiation source 42 is a surface-shaped ray beam perpendicular to the bearing surface 11 and parallel to the crossbeam 21. The surface-shaped ray beam is transmitted from left to right, and is referred to as a second surface-shaped ray beam. It may be understood that the second surface-shaped ray beam is located in a section shown in FIG. 1, and the second surface-shaped ray beam may cover the entire object to be detected in this section.

In this embodiment, as the movable gantry 20 and the movable bearing device 30 are moved synchronously relative to the bearing structure 10 along the first direction X perpendicular to the above section, the first surface-shaped ray beam and the second surface-shaped ray beam respectively perform scanning detection to the object to be detected. The first surface-shaped ray beam emitted by the first radiation source 41 penetrates the object to be detected and is received by the first detector array 51 to form a detection image of a vertical viewing angle, for example, a top view detection image. The second surface-shaped ray beam emitted by the second radiation source 42 penetrates the object to be detected and is received by the second detector array 52 to form a detection image of a horizontal viewing angle, for example, a detection image of a left viewing angle. The mobile detection device in this embodiment is a detection structure of a dual viewing angle, and this may better analyze the structural composition of the object to be detected, and further improve the detection effect.

In some embodiments, the detection image of the vertical viewing angle and the detection image of the horizontal viewing angle may be integrated into a stereoscopic detection image, and this is more conducive to analyzing the structural composition of the object to be detected and further optimizes the detection effect.

In some embodiments, the positions of the second radiation source 42 and the second detector array 52 may be interchanged. For example, the second radiation source 42 may be arranged in the second upright column 222 and used to emit a ray for detection, such as an X-ray, toward the first upright column 221, and the ray for detection may penetrate the object to be detected arranged on the bearing surface 11. In some embodiments, the second radiation source 42 may also be arranged at other positions of the second upright column 222. For example, the second radiation source 42 may also be arranged on a surface of a side of the second upright column 222 facing the first upright column 221. For example, the second radiation source 42 may also be arranged on a side of the second upright column 222 away from the first upright column 221, for example, arranged in a radiation source accommodation cabin fixed on a right side of the second upright column 222, and it is sufficient as long as the second radiation source 42 may emit a ray for detection toward the first upright column 221 in a horizontal direction. The second detector array 52 is arranged within the first column 221, arranged opposite to the second radiation source 42, and is used to receive a ray for detection emitted by the second radiation source 42. The relative position between the second radiation source 42 and the second detector array 52 remains unchanged. In some embodiments, the second detector array 52 may also be arranged at another position of the first upright column 221. For example, the second detector array 52 may also be arranged on a surface of a side of the first upright column 221 facing the second upright column 222.

In this embodiment, the mobile detection device is also a detection structure of a dual viewing angle, and it differs from the embodiment shown in FIG. 6 in that the second surface-shaped ray beam emitted by the second radiation source 42 penetrates the object to be detected and is received by the second detector array 52 to form a detection image of a right viewing angle.

Figure 7:
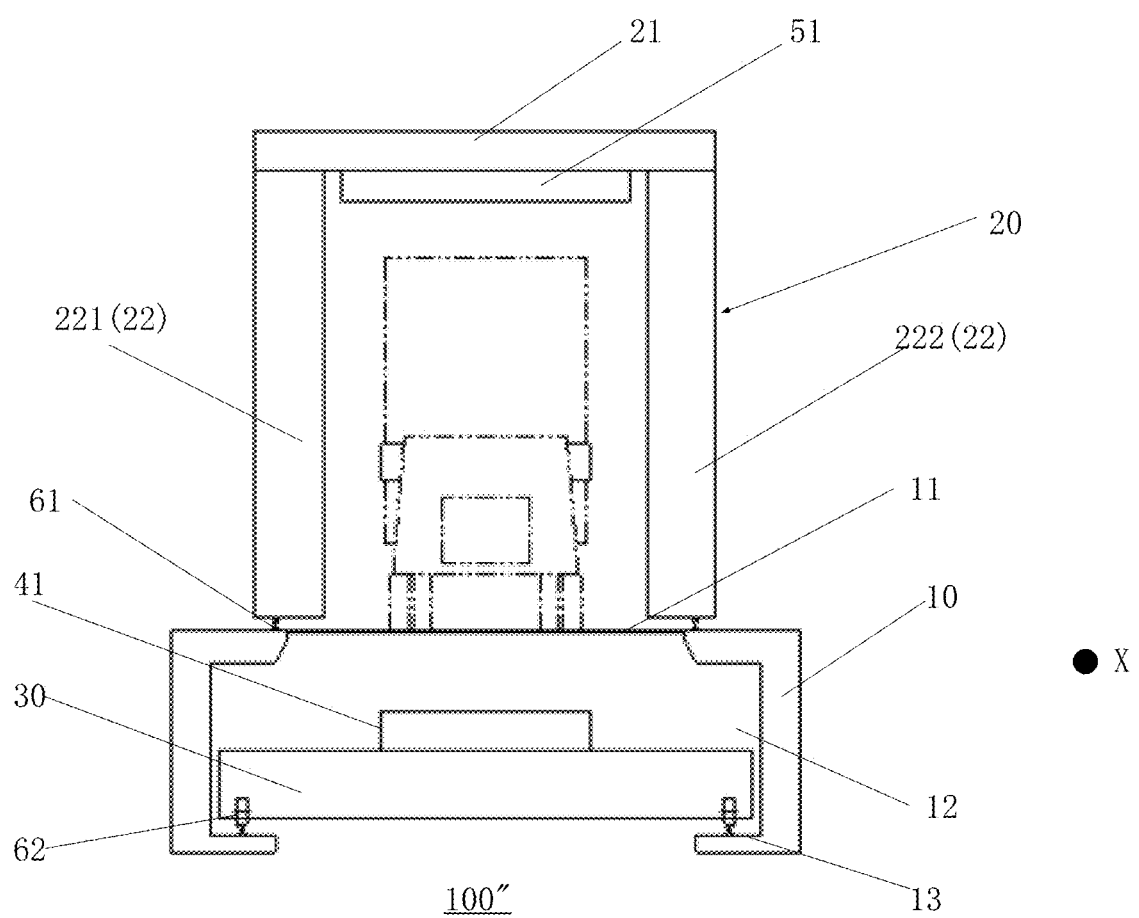
FIG. 7 is a schematic structural diagram of a mobile detection device according to some embodiments of the present disclosure.

FIG. 7 is a schematic structural diagram of a mobile detection device according to some embodiments of the present disclosure. The structure of the mobile detection device 100" shown in FIG. 7 is substantially the same as that of the mobile detection device 100 in the preceding embodiments. In the following, the differences between the mobile detection device 100" and the mobile detection device 100 in the preceding embodiments are mainly described in detail, and the similarities will not be repeated in detail.

As shown in FIG. 7, the mobile detection device 100" also includes a bearing platform 10 fixedly arranged, a movable gantry 20, a movable bearing device 30, a first radiation source 41 and a first detector array 51. It differs from the mobile detection device 100 in the embodiment shown in FIG. 1 in that: the positions of the first radiation source 41 and the first detector array 51 are interchanged.

Specifically, as shown in FIG. 7, the first radiation source 41 is arranged on a surface of the movable bearing device 30 facing the bearing surface 11. However, the embodiments of the present disclosure are not limited thereto. In some embodiments, the first radiation source 41 may also be arranged at another position of the movable bearing device 30. For example, the first radiation source 41 may also be arranged within the movable bearing device 30, it is sufficient as long as the first radiation source 41 may emit a ray for detection toward the bearing surface 11 in the vertical direction. The first detector array 51 is arranged on a surface of the crossbeam 21 facing the bearing surface 11. However, the embodiments of the present disclosure are not limited thereto. In some embodiments, the first detector array 51 may also be arranged at another position of the crossbeam 21. For example, the first detector array 51 may also be arranged within the crossbeam 21, it is sufficient as long as the first detector array 51 may receive a ray for detection emitted by the first radiation source 41 in the vertical direction.

In this embodiment, the ray for detection emitted by the first radiation source 41 is a surface-shaped ray beam perpendicular to the bearing surface 11 and parallel to the crossbeam 21. The surface-shaped ray beam is transmitted from bottom to top, and is referred to as a third surface-shaped ray beam. It may be understood that the third surface-shaped ray beam is located in a section shown in FIG. 1, and the third surface-shaped ray beam may cover the entire object to be detected in this section. As the movable gantry 20 and the movable bearing device 30 are moved synchronously relative to the bearing structure 10 along the first direction X perpendicular to the above section, the third surface-shaped ray beam may perform scanning detection to the object to be detected. The third surface-shaped ray beam emitted by the first radiation source 41 penetrates the object to be detected and is received by the first detector array 51 to form a detection image of a vertical viewing angle, such as a detection image of an upward viewing angle, and this may provide a better detection effect.

On the basis of the mobile detection device 100" in the embodiment shown in FIG. 7, a second radiation source and a second detection array may also be added to form a detection device of a dual viewing angle. One of the second radiation source and the second detection array is arranged on one of the first upright column 221 and the second upright column 222, and the other one of the second radiation source and the second detection array is arranged on the other one of the first upright column 221 and the second upright column 222. The second radiation source and the second detection array are arranged opposite to each other, and the relative position therebetween remains unchanged.

Figure 8:
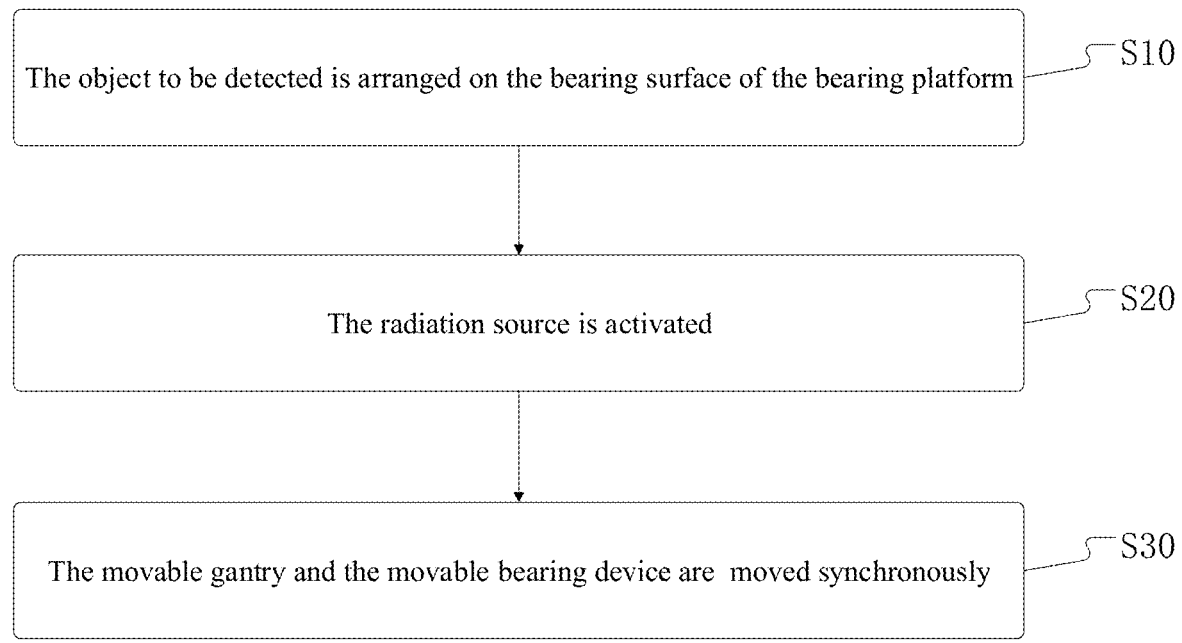
FIG. 8 is a flowchart of a detection method according to some embodiments of the present disclosure.

According to some embodiments of the present disclosure, there is provided a detection method. The detection method uses a mobile detection device mentioned in the preceding embodiment. FIG. 8 is a flowchart of a detection method according to some embodiments of the present disclosure.

As shown in FIG. 8, the detection method includes the following steps:

S10: the object to be detected is arranged on the bearing surface of the bearing platform;

S20: a radiation source is activated; and

S30: the movable gantry and the movable bearing device are moved synchronously.

In step S10, taking the object to be detected being a vehicle as an example, a drivers drives the vehicle onto the bearing surface 11 of the bearing platform 10, and the driver leaves the vehicle to avoid being exposed to a ray for detection during the detection process, thereby avoiding an injury to a person caused by the ray for detection.

In step S20, an activated radiation source includes the first radiation source 41 and/or the second radiation source 42.

In step S30, the relative position between the first radiation source 41 and the corresponding first detector array 51 remains unchanged, the first detector array 51 receives a ray for detection emitted by the first radiation source 41, and the ray for detection penetrates the object to be detected to form a detection image of a vertical viewing angle. The relative position between the second radiation source 42 and the corresponding second detector array 52 remains unchanged, the second detector array 52 receives a ray for detection emitted by the second radiation source 42, and the ray for detection penetrates the object to be detected to form a detection image of a horizontal viewing angle.

Although the present disclosure is described with reference to the accompanying drawings, the embodiments disclosed in the accompanying drawings are intended to illustrate the embodiments of the present disclosure and should not be construed as limiting the present disclosure. The dimension proportion in the drawings is only schematic and should not be construed as limiting the present disclosure.

The above embodiments only illustratively describe the principles and structures of the present disclosure, but are not intended to limit the present disclosure. Those skilled in the art should understand that any modification and improvement made to the present disclosure are within the scope of the present disclosure without departing from the general concept of the present disclosure. The protection scope of the present disclosure should be determined by the scope defined by the claims of the present application.

What is claimed is:

1. A mobile detection device, comprising:
a bearing platform, being arranged fixedly, and comprising a bearing surface for bearing an object to be detected;
a movable gantry, located on a side of the bearing surface bearing the object to be detected and configured to be movable relative to the bearing platform, wherein the movable gantry comprises: a crossbeam, arranged substantially parallel to the bearing surface, and an upright column, configured to support the crossbeam, and wherein the upright column comprises: a first upright column and a second upright column, respectively connected with both end portions of the crossbeam;
a movable bearing device, located on a side of the bearing surface away from the movable gantry and configured to be movable relative to the bearing platform;
a first radiation source, arranged on the movable bearing device, wherein a ray for detection emitted by the first radiation source is a surface-shaped ray beam perpendicular to the bearing surface;
a first detector array, arranged opposite to the first radiation source, and arranged on the crossbeam and arranged toward the bearing platform, so as to form a detection image of an upward viewing angle;
a second radiation source, arranged on one of the first upright column and the second upright column, wherein a ray for detection emitted by the second radiation source is a surface-shaped ray beam parallel to the bearing surface; and
a second detector array, arranged opposite to the second radiation source, and arranged on the other of the first upright column and the second upright column, so as to form a detection image of a horizontal viewing angle,
wherein the movable gantry and the movable bearing device are configured to be moved synchronously relative to the bearing platform,
wherein the detection image of the upward viewing angle and the detection image of the horizontal viewing angle are integrated into a stereoscopic detection image.

2. The mobile detection device according to claim 1, further comprising:
a first moving assembly, mounted between an end portion of the upright column facing the bearing platform and the bearing platform, and configured to allow the movable gantry to move relative to the bearing platform through the first moving assembly.

3. The mobile detection device according to claim 2, wherein the first mobile assembly comprises:
a first guide rail, arranged on a surface of the bearing platform facing the movable gantry; and
a first moving component, arranged at the end portion of the upright column facing the bearing platform, and cooperating with the first guide rail.

4. The mobile detection device according to claim 1, wherein the bearing platform comprises an accommodation space located on a side of the bearing surface away from the movable gantry, and the movable bearing device is arranged within the accommodation space.

5. The mobile detection device according to claim 4, further comprising:
a second moving assembly, arranged between a surface of a side of the movable bearing device away from the movable gantry and the bearing platform and configured to allow the movable bearing device to move relative to the bearing platform through the second moving assembly.

6. The mobile detection device according to claim 5, wherein the second mobile assembly comprises:
a second guide rail, arranged on a surface of the bearing platform bearing the movable bearing device; and
a second moving component, arranged on the surface of the side of the movable bearing device away from the movable gantry, and cooperating with the second guide rail.

7. The mobile detection device according to claim 1, further comprising:
a control device, configured to control the movable gantry and the movable bearing device to be moved synchronously relative to the bearing platform along a first direction.

8. The mobile detection device according to claim 7, wherein the control device comprises:
a first control device, configured to control a moving speed of the movable gantry relative to the bearing platform along the first direction in real time; and
a second control device, configured to control a moving speed of the movable bearing device relative to the bearing platform along the first direction in real time.

9. The mobile detection device according to claim 8, further comprising:

a first distance measuring device, configured to measure a first real-time distance between a fixed reference point on the bearing platform and the movable gantry along the first direction in real time; and
a second distance measuring device, configured to measure a second real-time distance between the fixed reference point on the bearing platform and the movable bearing device along the first direction in real time.

10. The mobile detection device according to claim 9, wherein,
with the first real-time distance being taken as a benchmark, the second control device is configured to control the moving speed of the movable bearing device relative to the bearing platform along the first direction in real time, so that the movable gantry and the movable bearing device are moved synchronously relative to the bearing platform along the first direction, or
with the second real-time distance being taken as a benchmark, the first control device is configured to control the moving speed of the movable gantry relative to the bearing platform along the first direction in real time, so that the movable gantry and the movable bearing device are moved synchronously relative to the bearing platform along the first direction.

11. A detection method, using a mobile detection device according to claim 1, the method comprising:
arranging the object to be detected on the bearing surface of the bearing platform;
activating the first radiation source; and
moving the movable gantry and the movable bearing device synchronously.

\* \* \* \* \*